(12) United States Patent
Will

(10) Patent No.: US 11,268,889 B2
(45) Date of Patent: Mar. 8, 2022

(54) THERMOGRAVIMETRIC ANALYSIS COMPONENTS

(71) Applicant: TA Instruments-Waters LLC, New Castle, DE (US)

(72) Inventor: Cornelia Will, Bochum (DE)

(73) Assignee: TA INSTRUMENTS-WATERS LLC, New Castle, DE (US)

( * ) Notice: Subject to any disclaimer, the term of this patent is extended or adjusted under 35 U.S.C. 154(b) by 203 days.

(21) Appl. No.: 16/707,307

(22) Filed: Dec. 9, 2019

(65) Prior Publication Data

US 2020/0200659 A1 Jun. 25, 2020

Related U.S. Application Data

(60) Provisional application No. 62/782,621, filed on Dec. 20, 2018.

(51) Int. Cl.
*G01N 5/04* (2006.01)
*G01K 15/00* (2006.01)
*G01K 1/14* (2021.01)

(52) U.S. Cl.
CPC .............. *G01N 5/04* (2013.01); *G01K 1/14* (2013.01); *G01K 15/005* (2013.01)

(58) Field of Classification Search
CPC ... F28D 2020/0078; Y02B 30/56; G01K 1/14; G01K 15/00; G01N 5/04; Y02E 10/44; Y02E 10/47
USPC ............ 374/10–12, 14, 15, 137, 29, 30, 208
See application file for complete search history.

(56) References Cited

U.S. PATENT DOCUMENTS

| | | | | |
|---|---|---|---|---|
| 3,069,044 A | * | 12/1962 | Haumann | A01N 1/02 220/215 |
| 4,550,771 A | * | 11/1985 | Arbabian | F24D 11/005 165/47 |
| 6,247,360 B1 | * | 6/2001 | Anderson | G01W 1/00 73/170.27 |
| 6,268,570 B1 | * | 7/2001 | McLendon | G01G 19/52 177/1 |
| 8,858,071 B2 | * | 10/2014 | Emanuel | G01N 25/18 374/44 |
| 9,121,749 B2 | * | 9/2015 | Izumo | G01G 21/28 |
| 2012/0294329 A1 | * | 11/2012 | Miller | G01N 25/18 374/44 |

(Continued)

FOREIGN PATENT DOCUMENTS

EP 1958323 B1 7/2010
WO 2017055571 A1 4/2017

*Primary Examiner* — Gail Kaplan Verbitsky
(74) *Attorney, Agent, or Firm* — Schmeiser, Olsen & Watts LLP

(57) ABSTRACT

Described is a convection reducer. The convection reducer may be used in a thermogravimetric analysis apparatus to reduce convection in fluid surrounding a sample container. The convection reducer includes multiple baffle plates and at least one spine member. Each baffle plate has an edge with at least one slot and each spine member has multiple slots. Each slot in a baffle plate is received in a corresponding slot of the at least one spine member so that the baffle plates are arranged substantially parallel to each other along the at least one spine member. The reduction in convection results in undesired forces on the apparatus that may disturb the sample weight measurement.

9 Claims, 5 Drawing Sheets

(56) References Cited

U.S. PATENT DOCUMENTS

2020/0131704 A1* 4/2020 Engqvist .................. D21F 1/66
2020/0291716 A1* 9/2020 Strycharske ........ E06B 3/26347

* cited by examiner

THERMOGRAVIMETRIC ANALYSIS COMPONENTS

RELATED APPLICATION

This application claims the benefit of the earlier filing date of U.S. provisional patent application No. 62/782,621, filed Dec. 20, 2018 and titled "Thermogravimetric Analysis Components," the entirety of which is incorporated herein by reference.

FIELD OF THE INVENTION

The technology generally relates to thermogravimetric analysis. More particularly, the technology relates to various components for a thermogravimetric analysis apparatus.

BACKGROUND

Thermogravimetric analysis is a method of thermal analysis in which the mass of a sample is measured over time as the temperature changes. TGA and apparatus for performing TGA are well known.

In order to perform the highly accurate weight measurements required by TGA, potential disturbances caused by the environment of the sample to be weighed may be identified and then mitigated against. The disturbances should be reduced as much as possible or, if this is not possible, the measured data may be corrected to the extent possible. The physical phenomenon of buoyancy may not be reduced or prevented but its effect on the weight measurement shall be corrected.

A sample is placed in a sample container arranged in a container holder. As it is heated, convection within the fluid surrounding the container lead to undesired forces on the system which disturb the weight measurement. Therefore, convection shall be reduced or best eliminated by convection reducers.

SUMMARY

A convection reducer includes a plurality of baffle plates and at least one spine member. Each baffle plate has an edge having at least one slot and each spine member has a plurality of slots. Each slot of each baffle plate is received in a corresponding slot of the at least one spine member so that the baffle plates are arranged substantially parallel to one another along the at least one spine member.

Each of the baffle plates may include a central aperture. Each edge of each baffle plate may be an outer edge of the baffle plate.

Each slot in the at least one spine member may extend across substantially half the width of the at least one spine member. The slots in each spine member of the at least one spine member may be arranged towards one end of the spine member and the other end of the spine member may include a projection to engage with an upper lip of a sample container.

Each slot of the baffle plates may be received in a corresponding slot of the at least one spine member with an interference fit.

Each baffle plate may include a plurality of slots and the convection reducer may include a corresponding plurality of spine members, wherein each slot in each baffle plate is received in a corresponding slot of a corresponding spine member. The slots in each baffle plate may be circumferentially equally distributed around the edge of the baffle plate.

The baffle plates and the at least one spine member may be comprised of a substantially inert material.

BRIEF DESCRIPTION OF THE DRAWINGS

Embodiments of the present invention will now be described, by way of non-limiting example only, with reference to the figures in which.

DETAILED DESCRIPTION

Convection Reducer

Figure 1:
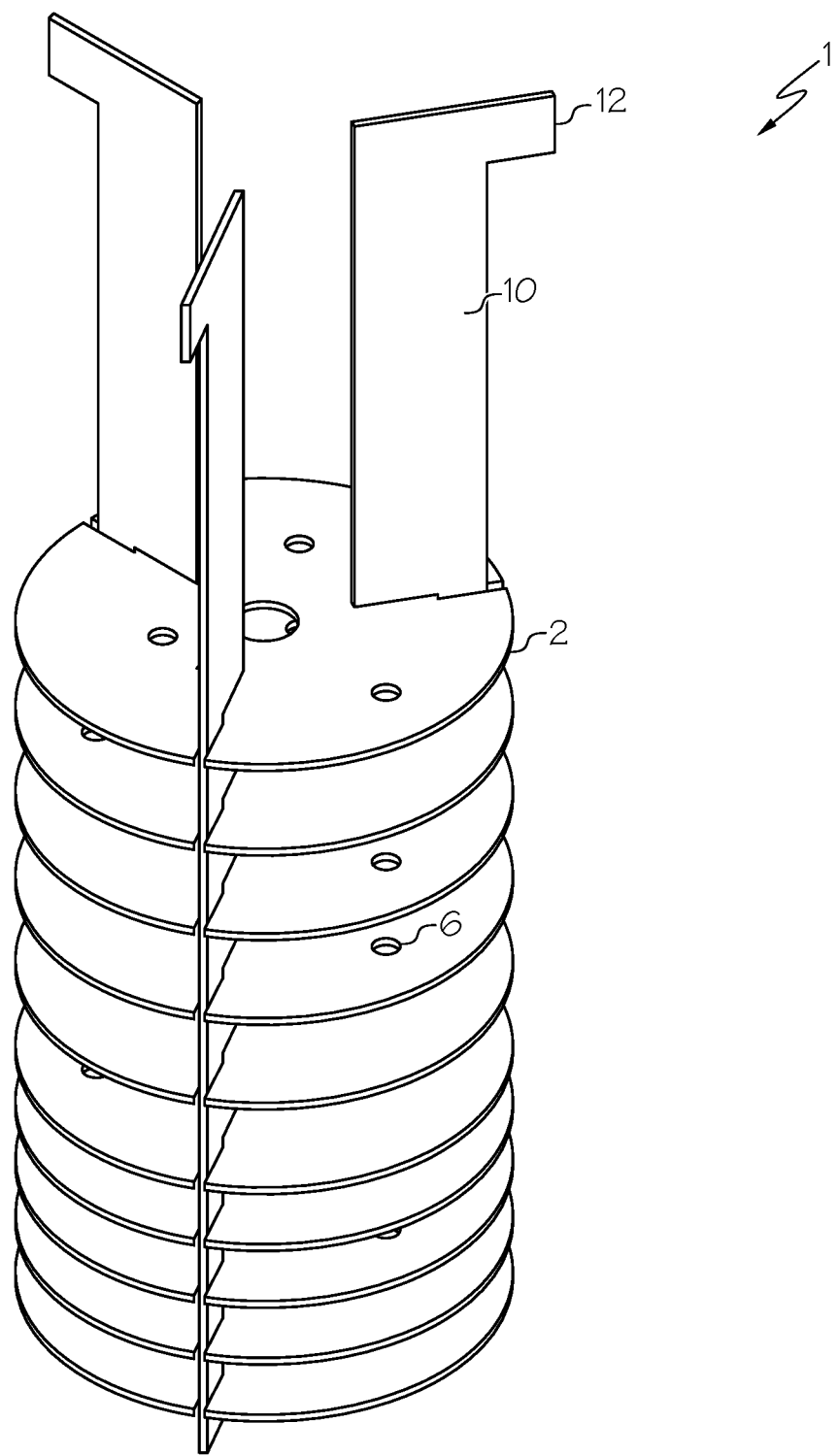
FIG. 1 illustrates a convection reducer according to one embodiment of the present invention.
Figure 2:
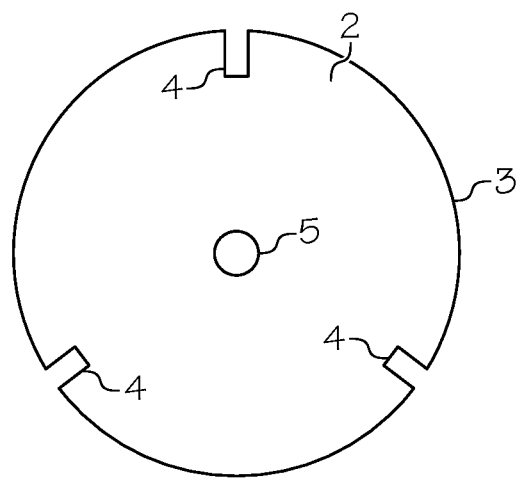
FIG. 2 illustrates a baffle plate of the convection reducer of FIG. 1.

A convection reducer 1 embodying the present invention is shown in FIG. 1. The convection reducer 1 comprises a plurality of baffle plates 2 and at least one spine member 10. In the embodiment of the convection reducer 1 shown in FIG. 1, there are ten baffle plates 2 and three spine members 10. Other configurations are possible, with more or fewer baffle plates 2 and more or fewer spine members 10.

Each of the baffle plates 2 comprises an outer edge 3 having at least one slot 4. In the embodiment shown, there are three slots 4, circumferentially distributed around the outer edge 3. The circumferential distribution of the slots 4 is not essential. Two neighbouring slots 4 may be arranged closer to one another than two other neighbouring slots 4.

Figure 6:
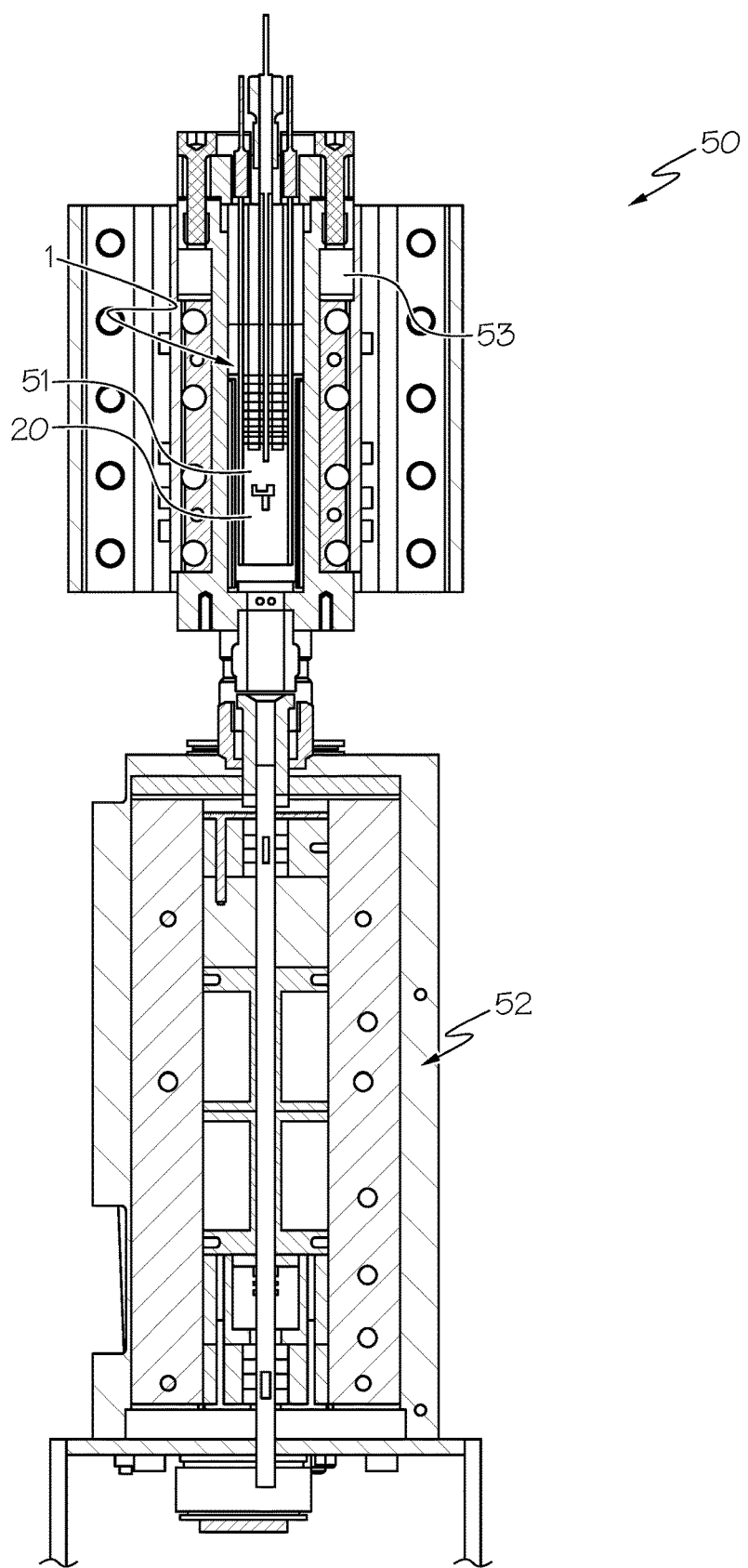
FIG. 6 illustrates a cross-sectional view of a thermogravimetric analysis arrangement.

The spine members 10 are provided with a plurality of slots 11. The slots 11 may be equally distributed along at least a part of the longitudinal axis of the spine member 10. In the embodiment shown, the plurality of slots 11 in the spine member 10 are arranged towards one end of the spine member 10. At the other end of the spine member 10, there is provided a projection 12 which, in use, may engage with a part of a thermogravimetric analysis arrangement. In use, the convection reducer 1 may be arranged above a sample location (e.g. a sample container). With reference to FIG. 6, the convection reducer 1 may be suspended within an oven chamber of the thermogravimetric analysis arrangement such that no other part of the convection reducer 1 may contact with the inner surfaces of the oven chamber.

It will be appreciated that the number of slots 11 provided in the spine member 10 is equal to the number of baffle plates 2. However, this is not essential. There may be some unused slots 11 in the spine member 10, depending on the configuration of the convection reducer 1.

Figure 3:
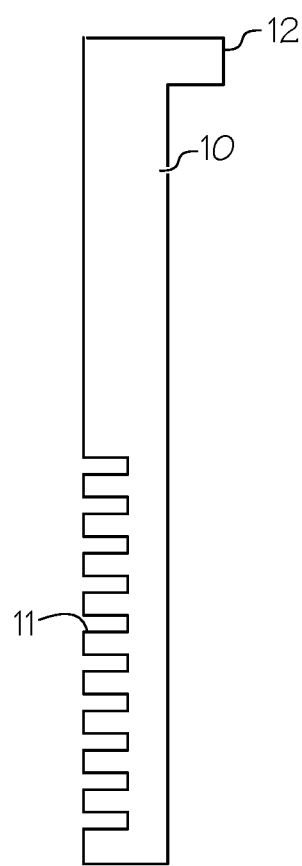
FIG. 3 illustrates a spine member of the convection reducer of FIG. 1.

In other embodiments, the slots 11 may be distributed differently to that illustrated in FIG. 3. Correspondingly, the baffle plates 2 may be distributed in a way other than equally along the longitudinal length of the convection reducer 1.

Each of the slots 4 of each of the baffle plates 2 is received in a corresponding slot 11 of the spine member 10 so that the baffle plates 2 are arranged substantially parallel to one another along the spine member 10.

The slots 11 may extend across substantially half the width of the spine member 10, as shown in FIG. 3. The depth of the slots 4 in the baffle plates 2 may be of substantially the same depth as that of the slots 11 in the spine member 10. When the corresponding slots 4, 11 are mated with one another, the body of each of the spine members 10 is substantially received within the footprint of the baffle plates 2, as indicated in FIG. 1. Consequently, the convection reducer 1 has a substantially cylindrical shape. Preferably, the convection reducer 1 is configured such that the diameter of the baffle plates 2 is equal to or less than the inner diameter of the oven chamber into which the convection reducer 1 may be arranged in use.

The slots 4, 11 of the baffle plates 2 and spine members 10 may receive one another with a substantially interference fit. In one embodiment, there is no gluing or otherwise adhesive connection between the baffle plates 2 and spine members 10.

The baffle plates 2 may further comprise a central aperture 5. Other apertures 6 may be provided, but are not essential.

In one embodiment, the baffle plate 2 and/or spine members 10 are comprised of a substantially inert material. By using an inert material, there are no metal surfaces inside the sample container.

An advantage of a convection reducer 1 embodying a present invention is that it is easy to assemble by being intuitive to a user. No soldering, welding or otherwise any adhesion is necessary. The parts may be produced cheaply from planar material.

The baffle plates 2 and/or spine members 10 may be manufactured by laser cutting a ceramic planar substrate.

In the embodiment illustrated, the slots 4 are provided on an outer edge 3 of the baffles 2. In another embodiment (not shown), the central aperture 5 may be larger, and the plurality of slots 4 may be provided within the aperture 5, on an inner edge of the baffle plates 2. So long as the aperture 5 is sized large enough, at least one spine member 10 may then be inserted through the aperture and a respective one of the slots 11 of the spine member 10 may be engaged with a corresponding "inner slot" within the aperture 5.

In one embodiment, there may only be a single spine member 10. The depth of the slots 4, 11 may be sized such that, when they are received with a substantially interference fit, the plurality of baffle plates 2 are held substantially rigidly and parallel to one another.

Curie Levitation System

In one embodiment, the present invention provides a thermogravimetric analysis apparatus comprising:
an oven chamber;
a container holder arranged within the oven chamber, for receiving a sample container in use;
a magnetic levitation system, containing at least one first magnet, the system operatively connected to and supporting the container holder; and
at least one second magnet arranged adjacent the oven chamber so as to selectively impart a magnetic force in the region of the container holder.

The present invention further provides a method of calibrating a thermogravimetric analysis apparatus, the apparatus having:
an oven chamber;
a container holder arranged within the oven chamber, and a sample container received in the container holder;
a magnetic levitation system, containing at least one first magnet, the system operatively connected to and supporting the container holder;
at least one second magnet arranged adjacent the oven chamber so as to impart a magnetic force in the region of the container holder; and
a temperature sensor to measure the temperature of a sample receivable in the sample container, the method comprising:
providing a magnetic sample, having a known curie point temperature, in the sample container;
using the at least one second magnet to impart a magnetic force on the sample;
heating the sample;
recording the measured temperature at which the sample is detected to substantially lose its paramagnetic properties; and
comparing the recorded measured temperature to the known curie point temperature of the sample.

FIG. 6 illustrates a cross-sectional view of a thermogravimetric analysis arrangement 50. The arrangement 50 comprises an over chamber 51 having associated heating means to control the temperature within the oven chamber 51. The arrangement 50 further comprises a container holder 20 arranged within the oven chamber 51. The container holder 20 may be the same as that illustrated in FIG. 4 and described in this specification. However, this is not essential. The container holder 20 of the arrangement 50 may take other forms.

The arrangement 50 further comprises a magnetic levitation system 52, containing at least one first magnet. The system 52 is operatively connected to and supports the container holder 20.

The arrangement 50 further comprises at least one second magnet 53 arranged adjacent the oven chamber 51 so as to selectively impart a magnetic force in the region of the container holder 20.

In one embodiment, the at least one second magnet 53 is provided by a coil arranged around the oven chamber 51. The coil selectively imparts a magnetic force by energising the coil.

As will be noted from FIG. 6, the magnetic levitation system 52 is spaced apart from the container holder 20. In one embodiment, the spacing is such that the first magnetic field of the at least first one magnet of the magnetic levitation system 52 substantially does not interact with a sample in a sample container receivable in the container holder 20. In one embodiment, the at least one first magnet within the magnetic levitation system 52 is spaced at least 210 mm from the container holder 20.

In at least one embodiment, the at least one first magnet within the magnetic levitation system 52 is spaced from the at least one second magnet 53. In one embodiment, the spacing is such that the first magnetic field of the at least one first magnet of the magnetic levitation system 52 substantially does not interact with a second magnetic field of the at least one second magnet 53. In one embodiment, the first magnet is spaced from the second magnet by at least 218 mm.

In at least one embodiment, the at least one second magnet 53 is spaced from the container holder 20 by at least 70 mm.

The thermogravimetric analysis arrangement 50 may further comprise a temperature sensor (not shown) for measuring the temperature of a sample held in a sample container 30 receivable in the container holder 20.

The arrangement 50 may further comprise a force sensor (not shown) operatively connected to the container holder 20 for measuring the force imparted by a sample in a sample container 30 receivable in the container holder 20.

In at least one embodiment, the magnetic levitation system may be substantially as disclosed in European Patent EP1958323. The contents of that published patent are incorporated herein in their entirety.

The benefits of the magnetic levitation system 52 may be as described in the above-mentioned patent. It may be preferable to adopt such arrangements with a thermogravimetric analysis arrangement 50. At the same time, it is necessary to calibrate the thermogravimetric analysis arrangement 50 so as to ensure it is accurate. One method of calibrating a temperature sensor of the thermogravimetric analysis arrangement 50 is using the Curie Principal. As is known in the art, the Curie temperature (or Curie point) is the temperature above which certain materials lose their permanent magnetic properties, i.e. the material goes from ferromagnetic to non-magnetic. When the in the vicinity of an external magnetic field, the reduced attraction of the magnetic bodies results in a sharp apparent weight loss or gain (depending on the arrangement). This sharp weight change may lend itself well for calibration purposes.

Therefore, in order to calibrate the thermogravimetric analysis arrangement 50, an embodiment utilises the at least one second magnet 53 to impart a magnetic force on the sample. The temperature within the oven chamber 51 may be increased until the sudden weight change is detected by an associated force sensor. Since the Curie point of the sample is known, it is possible to compare the recorded measured temperature at that point with the known Curie point temperature of the sample. In the even that they differ, the temperature sensor (and/or associated control electronics) of the thermogravimetric analysis arrangement 50 may be calibrated such that, at that point, the returned measured temperature is substantially equal to the Curie temperature.

Accordingly, in one embodiment of the present invention, there is provided a method of calibrating a thermogravimetric analysis arrangement 50 such as that described above. The method comprises providing a magnetic sample, having a known Curie point temperature, in the sample container 30 held in the container holder 20. The at least one second magnet 53 is then used to impart a magnetic force on the sample. The sample is then heated within the oven chamber 51. The thermogravimetric analysis arrangement 50 records the measured temperature from a temperature sensor at which the sample is detected to substantially lose its paramagnetic properties. Next, the recorded measured temperature is compared to the known Curie point temperature of the sample. In at least one embodiment, a force sensor which is operatively connected to the container holder is used to detect when the sample substantially loses its paramagnetic properties. This is detected by a sudden drop/increase in the measured weight of the sample.

Since the magnetic levitation system 52 comprises at least one first magnet, it may interfere with the magnetic fields created by the second magnet 53, or vice versa.

To alleviate these effects, a thermogravimetric analysis arrangement 50 embodying the present invention is configured so as to reduce the effects of the magnetic fields on one another. Accordingly, in one embodiment, the magnetic levitation system 52 is spaced apart from the container holder 20.

Container Holder

Figure 4:
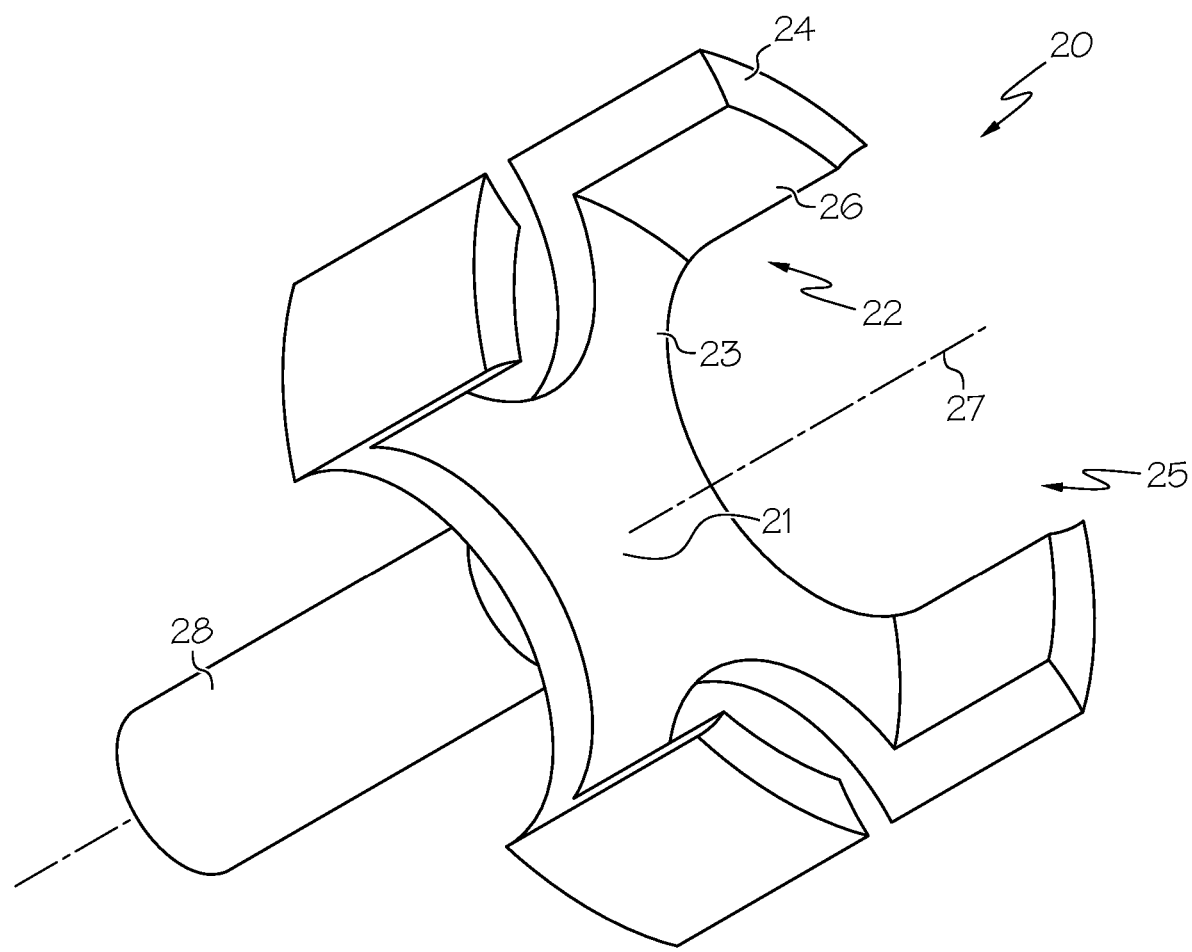
FIG. 4 illustrates a container holder according to one embodiment of the present invention.
Figure 5:
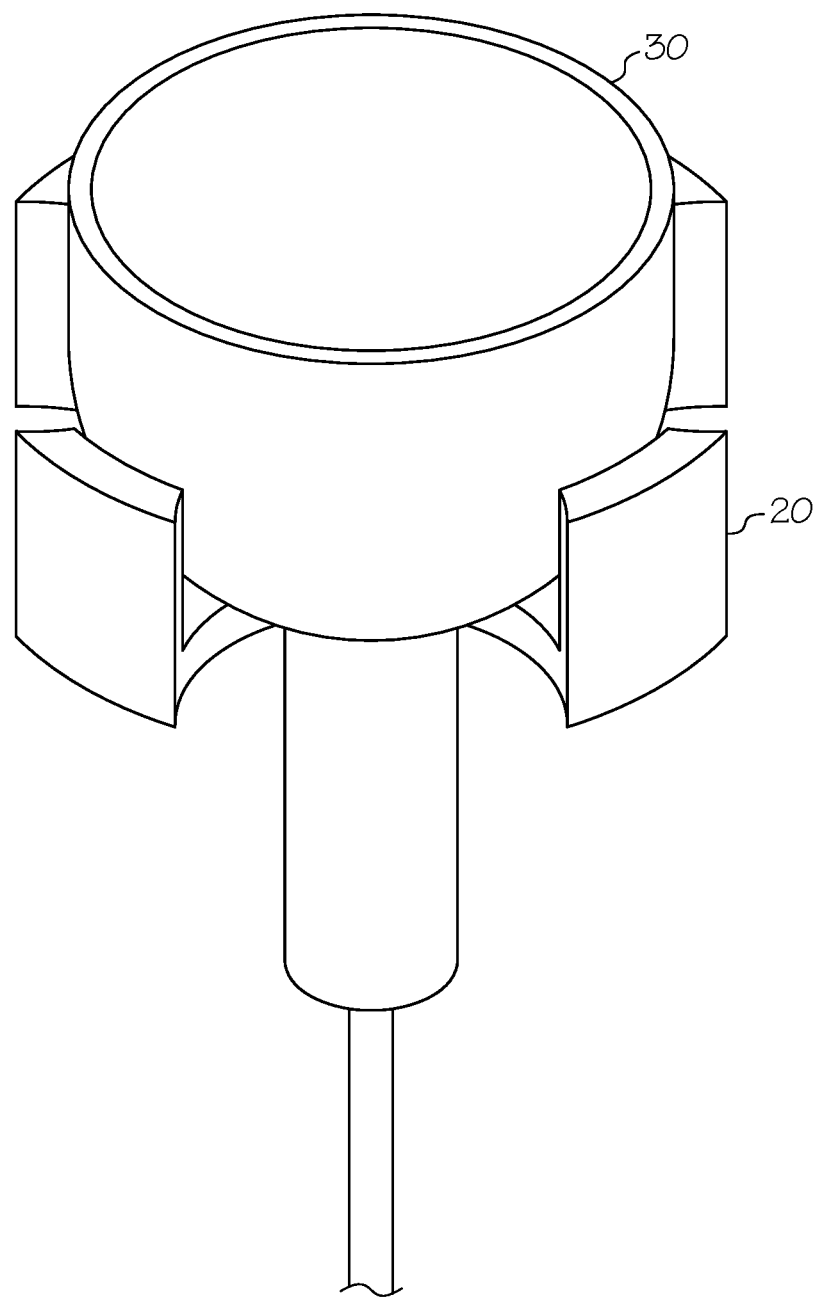
FIG. 5 illustrates a sample holding assembly according to one embodiment of the present invention, including the container holder of FIG. 4 and a sample container supported by the container holder.

FIGS. 4 and 5 illustrate a container holder 20 (pan holder) for a thermogravimetric analysis apparatus. The container holder 20 comprises a central hub 21 and at least two arms 22 extending from the hub 21 to support a sample container 30 (pan), shown in FIG. 5.

In the embodiment shown in FIG. 4, there are four arms 22 extending from the central hub 21. The arms 22 may be equally circumferentially spaced around the hub 21, such that each arm 22 is arranged substantially opposite another arm 22.

Each arm 22 comprises a first portion 23 extending substantially radially from the hub 21. Each arm 22 further comprises a second portion 24 extending substantially perpendicularly from the first portion 23. The respective second portions 24 of the arms 22 define a bay 25 therebetween for receiving the sample container 30.

In the embodiment shown, an inner surface 26 of the second portion 24 is substantially arcuate, having a radius substantially equal to the distance between the inner surface 26 of the second portion 24 and a longitudinal axis 27 of the container holder 20. When used with a cylindrical sample container 30, such as that illustrated in FIG. 5, the radius of the arcuate portion 26 may be chosen so as to be equal to or greater than the diameter of the outer surface of the sample container 30, such that the sample container 30 may be received within the bay 25 with a substantially sliding fit. In another embodiment, it may be received in an interference fit.

At least a part of the first portion 23, for example a middle section thereof, may be thinner than the second portion 24. The middle section of the first portion 23 may be thinner than the respective ends of the first portion 23, such as that shown in FIG. 4.

The container holder 20 may further comprise a rod 28 attached to the hub 21. The second portions 24 of the arms 22 extend from the hub 21 in the direction opposite to that of the rod 28.

In at least one embodiment, at least a part of the container holder 20 is comprised at least partially of ceramic.

In at least one embodiment, the container holder 20 has a mass of less than 220 mg. Preferably, the mass is between 50 mg and 150 mg. Preferably, the mass is between 80 mg and 120 mg. Preferably, the mass is 110 mg. Preferably, the mass of the container holder 20 is such that it creates less of a buoyancy effect than known container holders 20.

A benefit of a container holder 20 embodying the present invention is that it has a low mass. Consequently, the container holder 20 has less of an effect on the temperature of the sample, by not creating a heat sink. Moreover, the almost skeletal structure of the container holder 20 allows the other surface of the sample container to be substantially exposed to the temperature within the sample container. An existing container holder may comprise a substantially cylindrical body, which receives the sample container therein. Not only does such an arrangement conceal the outer surface of the sample container held within, it also increases the mass of the container holder, which may affect the thermal performance of the TGA apparatus. A further benefit of a container holder 20 embodying the present invention is that it substantially exposes the sides of the sample container 30 allowing it to be gripped (e.g. by callipers), for removing and placing the sample container 30 on the container holder 20.

With reference to FIG. 4, it will be appreciated that the container holder 20 embodying the present invention is effectively the same as the known cylindrical container holder, but with four large sections of material removed, so as to leave four arms extending from a central hub. A container holder 20 embodying the present invention provides the physical support needed to hold the sample container 30 in place, whilst reducing the thermal effect thereon and being lighter, preferably much lighter.

A cylindrical sample container has been disclosed, in combination with a container holder defining a substantially cylindrical bay for receiving the sample holder. Other arrangements and shapes are of course possible, including those having a substantially cuboid shape.

When used in this specification and claims, the terms "comprises" and "comprising" and variations thereof mean that the specified features, steps or integers are included. The terms are not to be interpreted to exclude the presence of other features, steps or components.

What is claimed is:

1. A convection reducer comprising:
   a plurality of baffle plates, each baffle plate having an edge having at least one slot; and
   at least one spine member having a plurality of slots,
   wherein the at least one slot of each baffle plate is received in a corresponding slot of the at least one spine member so that the baffle plates are arranged substantially parallel to one another along the at least one spine member.

2. The convection reducer of claim 1, wherein each edge is an outer edge of one of the baffle plates.

3. The convection reducer of claim 1, wherein each slot in the at least one spine member extends across substantially half the width of the at least one spine member.

4. The convection reducer of claim 1, wherein each slot of the baffle plates is received in a corresponding slot of the at least one spine member with an interference fit.

5. The convection reducer of claim 1, wherein each baffle plate comprises a plurality of slots and the convection reducer comprises a corresponding plurality of spine members, wherein each of the slots in each baffle plate is received in a corresponding slot of a corresponding spine member.

6. The convection reducer of claim 5, wherein the slots in each baffle plate are circumferentially equally distributed around the edge of the baffle plate.

7. The convection reducer of claim 1, wherein each of the baffle plates comprises a central aperture.

8. The convection reducer of claim 1, wherein the plurality of slots in the at least one spine member is arranged towards one end of the at least one spine member and the other end of each spine member of the at least one spine member comprises a projection to engage with an upper lip of a sample container.

9. The convection reducer of claim 1, wherein the baffle plates and the at least one spine member are comprised of a substantially inert material.

* * * * *